United States Patent
Masuda et al.

(10) Patent No.: US 8,405,796 B2
(45) Date of Patent: Mar. 26, 2013

(54) ILLUMINATION DEVICE, SURFACE LIGHT SOURCE DEVICE, AND LIQUID CRYSTAL DISPLAY DEVICE

(75) Inventors: Takeshi Masuda, Osaka (JP); Yuhsaku Ajichi, Osaka (JP); Yukihide Kohtoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 221 days.

(21) Appl. No.: 13/002,510

(22) PCT Filed: Apr. 10, 2009

(86) PCT No.: PCT/JP2009/057380
§ 371 (c)(1),
(2), (4) Date: Jan. 4, 2011

(87) PCT Pub. No.: WO2010/007822
PCT Pub. Date: Jan. 21, 2010

(65) Prior Publication Data
US 2011/0109835 A1    May 12, 2011

(30) Foreign Application Priority Data
Jul. 14, 2008    (JP) .................................. 2008-182715

(51) Int. Cl.
G02F 1/1335 (2006.01)
F21V 7/04 (2006.01)
F21V 5/00 (2006.01)

(52) U.S. Cl. ............ 349/65; 349/64; 362/602; 362/616; 362/617; 362/621; 362/246

(58) Field of Classification Search .............. 349/61–65; 362/600–634, 97.1, 97.2, 97.3, 97.4, 227, 362/234–236, 244, 246
See application file for complete search history.

(56) References Cited

U.S. PATENT DOCUMENTS

| | | | |
|---|---|---|---|
| 5,555,160 | A | 9/1996 | Tawara et al. |
| 5,704,703 | A | 1/1998 | Yamada et al. |
| 2001/0012202 | A1 | 8/2001 | Yamada et al. |
| 2001/0053072 | A1 | 12/2001 | Takemoto |
| 2003/0210540 | A1 | 11/2003 | Yamada et al. |
| 2009/0316074 | A1 | 12/2009 | Tomiyoshi |

FOREIGN PATENT DOCUMENTS

| | | |
|---|---|---|
| JP | 06-102414 A | 4/1994 |
| JP | 2001-184929 A | 7/2001 |
| JP | 2003-272423 A | 9/2003 |
| JP | 2004-206916 A | 7/2004 |
| JP | 2006-134748 A | 5/2006 |
| JP | 2009-032593 A | 2/2009 |
| WO | 2008/050509 A1 | 5/2008 |

OTHER PUBLICATIONS

Official Communication issued in International Patent Application No. PCT/JP2009/057380, mailed on Jul. 14, 2009.

*Primary Examiner* — Uyen Chau N Le
*Assistant Examiner* — Michael Mooney
(74) *Attorney, Agent, or Firm* — Keating & Bennett, LLP

(57) ABSTRACT

Each of light guides (2) has: a reflection surface (2e); and a light emitting surface (2c) that is opposite to the reflection surface (2e) and is not covered by a neighboring light guide (2). The light emitting surface (2c) is made up of a first emitting surface (7) and a second emitting surface (8). The first emitting surface (7) is substantially parallel with the reflection surface (2e). The second emitting surface (8) is substantially parallel with an irradiated surface. The each of the light guides (2) is provided with microprisms (9) serving as diffusing means at least in a first emitting surface region (12) in which there is the first emitting surface (7).

6 Claims, 11 Drawing Sheets

F I G. 1 1
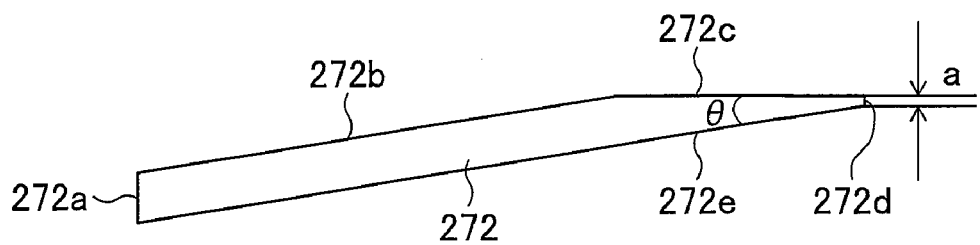

ILLUMINATION DEVICE, SURFACE LIGHT SOURCE DEVICE, AND LIQUID CRYSTAL DISPLAY DEVICE

TECHNICAL FIELD

The present invention relates to (i) an illumination device used as a backlight of a liquid crystal display device etc., (ii) a surface light source device used as a backlight of a liquid crystal display device etc., and (iii) a liquid crystal display device including the surface light source device.

BACKGROUND ART

A liquid crystal display device has become rapidly widespread recently in place of a cathode ray tube (CRT) display device. Such a liquid crystal display device is for widely use in an electronic device such as a liquid crystal display television, a monitor, or a mobile phone, because the liquid crystal display device has the advantages that it is energy-saving, thin, and light. It is possible to further put such advantages to good use by, for example, improving an illumination device (a so-called backlight), which is provided behind the liquid crystal display device.

The illumination device is broadly classified into a side illumination device (also called "an edge illumination device") and a direct illumination device. The side illumination device is arranged such that (i) a light guide plate is provided behind a liquid crystal display panel and (ii) a light source is provided on a lateral end of the light guide plate. Such a side illumination device uniformly irradiates the liquid crystal display panel as follows. The light emitted from the light source is reflected by the light guide plate, and is then directed toward the liquid crystal display panel. According to the arrangement, it is possible to achieve a thinner illumination device that is excellent in uniformity of luminance, although such an illumination device is not so excellent in luminance level. Because of its excellent uniformity of luminance, the side illumination device is mainly employed in a medium-small size liquid crystal display for use in a device such as a mobile phone or a laptop computer.

The direct illumination device is such that a plurality of light sources are provided behind the liquid crystal panel so as to directly irradiate the liquid crystal panel. The direct illumination device thus easily achieves high luminance even in a case where it is used in a large display. Therefore, the direct illumination device is mainly employed in a liquid crystal display that is as large as 20 inches or more. However, a conventional direct illumination device is some approximately 20 mm to 40 mm in thickness, which is a problem to be solved for further reducing a thickness of the display.

In order to further reduce a thickness of a large liquid crystal display, the light sources and the liquid crystal display panel should be provided closer to each other. In doing so, the number of light sources needs to be increased so as to achieve uniformity of luminance of the illumination device. However, the increase in the number of the light sources causes cost increase. Under such circumstances, it is desired to develop, without increasing the number of the light sources, an illumination device that is thin and excellent in uniformity of luminance.

In order to solve these problems, an attempt has been conventionally carried out to reduce, by employing an illumination device constituted by arranging a plurality of light guide units, a thickness of a large liquid crystal display device.

For example, Patent Literature 1 discloses a technique of achieving a thin illumination device by arranging light guide units so as to overlap one another. This is described below with reference to FIG. 10.

FIG. 10 is a partial cross-sectional view illustrating the illumination device of Patent Literature 1. As illustrated in FIG. 10, an illumination device 180 includes: a plurality of light guide units; and a diffusing sheet 175. Each of the plurality of light guide units includes (i) a fluorescent tube 171, (ii) a light guide 172 having an incidence surface 172a, an emitting surface 172b, and a reflection surface 173 that reflects light toward the emitting surface 172b, and (iii) a reflection mirror 174.

The plurality of light guide units overlap each other such that (i) they are at an angle and (ii) a side surface of each of the light guides 172 is adjacent to another reflection surface 173 of a neighboring light guide 172. The emitting surface 172b of each of the light guides 172 serves as a light emitting surface, and is at an angle θ of 30 degrees to the reflection surface 173.

Patent Literature 1 teaches that, according to the configuration, it is possible to achieve a thin illumination device 180 that has high use efficiency of light beams and thus has high luminance.

CITATION LIST

Patent Literature

Patent Literature 1
Japanese Patent Application Publication, Tokukai, No. 2003-272423 A (Publication Date: Sep. 26, 2003)

SUMMARY OF INVENTION

Technical Problem

However, according to the illumination device 180 described in Patent Literature 1, the angle θ between the emitting surface 172b and the reflection surface 173 is 30 degrees, which is still relatively large. Therefore, a thickness of the illumination device 180 is not sufficiently reduced.

Specifically, in order to further reduce the thickness of the illumination device, the angle θ between the emitting surface and the reflection surface of each of the light guides needs to be further reduced so as to reduce a thickness of each of the light guides in a direction perpendicular to the emitting surface.

In view of this, each of the light guides is modified such that the angle θ between the emitting surface and the reflection surface is further reduced. FIG. 11 illustrates a shape of one of such light guides.

As illustrated in FIG. 11, an angle θ between an emitting surface 272c and a reflection surface 272e of a light guide 272 is sufficiently reduced as compared with the light guide 172. Accordingly, a thickness of the light guide 272 in a direction perpendicular to the emitting surface 272c is largely reduced.

Meanwhile, in view of ensuring of strength of a light guide and easy produceability of the light guide, a lower limit of a realizable thickness a of an edge portion 272d of the light guide 272 has been known to be 0.2 mm.

In order to cause light entered the light guide 272 through the incidence surface 272a to be efficiently emitted outward through the emitting surface 272c, it is necessary to keep loss of the light to a minimum in a light guide part region. The light guide part region is defined by (i) an upper surface 272b extending from the incidence surface 272a to the emitting surface 272c and (ii) the reflection surface 272e.

In view of this, it is necessary to maintain an amount of the incident light in the light guide part region. To this end, the upper surface 272b and the reflection surface 272e need to be parallel with each other so that the incident light meets the total reflection condition in the light guide part region.

However, in a case where a plurality of light guides 272 overlap each other, for the purpose of improving uniformity of luminance in a light emitting surface, such that the plurality of light guides 272 lean on their neighboring one and that their emitting surfaces 272c are aligned in the similar way to that of the configuration of FIG. 10, the following occurs. That is, in the light emitting surface made up of the emitting surfaces 272c, gaps are formed between respective adjacent ones of the emitting surfaces 272c of the respective plurality of light guides 272. This is because the edge portion 272d of each of the plurality of light guides 272 has a certain thickness due to manufacturing limitations on each of the plurality of light guides 272.

This will be more specifically described below with reference to FIG. 12.

FIG. 12 illustrates an illumination device 280 in which the plurality of light guides 272 of FIG. 11 overlap each other such that the plurality of light guides 272 lean on their neighboring one and that their emitting surfaces 272c are aligned.

As illustrated in FIG. 12, gaps 274 are formed between respective adjacent ones of the emitting surfaces 272c of the respective plurality of light guides 272, which overlap each other such that the plurality of light guides 272 lean on their neighboring one. This is because the edge portion 272d cannot have a sharply pointed end in view of the manufacturing limitations on the light guide.

Each of the gaps 274 is formed above the light guide part region of a corresponding one of the plurality of light guides 272. The light guide part region guides light from a corresponding one of light sources 271 toward a corresponding one of the emitting surfaces 272c.

In the light guide part region defined by the upper surface 272b and the reflection surface 272e, the light strikes the upper surface 272b and the reflection surface 272e with an angle of incidence larger than or equal to a total reflection critical angle. The total reflection critical angle depends on material from which a corresponding one of the light guides 272 is made.

That is, in the light guide part region, the incident light is totally reflected. Accordingly, little light is emitted from each of the gaps 274. Therefore, the gaps 274 look dark when the light emitting surface is viewed as a whole.

That is, in a case where an illumination device is configured, for the purpose of further reducing its thickness, such that (i) an angle between an emitting surface and a reflection surface of each of a plurality of light guides is sufficiently small and (ii) the plurality of light guides overlap each other such that the plurality of light guides lean on their neighboring one so that their emitting surfaces are aligned, the following problem occurs. That is, gaps are formed between respective adjacent ones of the emitting surfaces of the respective plurality of light guides, because an edge portion of each of the plurality of light guides has a certain thickness. As a result, unevenness of brightness occurs in a light emitting surface of the illumination device.

The present invention has been made in view of the problems, and an object of the present invention is to provide a thin illumination device, which is capable of further improving uniformity of luminance in a light emitting surface even in a case where gaps are formed between respective adjacent ones of emitting surfaces of respective light guides. The illumination device is configured, for the purpose of further reducing a thickness of each of the illumination device, a surface light source device, and a liquid crystal display device, such that (i) an angle between an emitting surface and a reflection surface of each of the light guides is sufficiently small and (ii) the light guides overlap each other such that the light guides lean on their neighboring one so that their emitting surfaces are aligned. Further, such an illumination device is a lightweight illumination device having improved strength and produce ability.

Another object of the present invention is to provide a surface light source device including the illumination device, which surface light source is a thin surface light source device capable of further improving uniformity of luminance in a light emitting surface. Further, such a surface light source device is a lightweight surface light source device having improved strength and produceability.

A further object of the present invention is to provide a liquid crystal display device including the surface light source device as a backlight, which liquid crystal display device is a thin liquid crystal display device with high display quality. Further, such a liquid crystal display device is a lightweight liquid crystal display device having excellent durability and produceability.

Solution to Problem

In order to attain the above object, an illumination device in accordance with the present invention includes: a plurality of groups each including (i) a light source and (ii) a light guide for obtaining plane light emission by diffusing light from the light source, the light guides overlapping each other such that the light guides lean on their neighboring one so as to make an angle to an irradiated surface, each of the light guides having (i) a reflection surface, which is on a side opposite to the irradiated surface and (ii) a light emitting surface, which is opposite to the reflection surface and is not covered by a neighboring one of the light guides, the light emitting surface being made up of (a) a first emitting surface, which is substantially parallel with the reflection surface and (b) a second emitting surface, which is substantially parallel with the irradiated surface, the first emitting surface and a first part of the reflection surface defining a first emitting surface region of said each of the light guides, and said each of the light guides being provided with, at least in the first emitting surface region, diffusing means for diffusing the light.

<Explanation for Second Emitting Surface>

The second emitting surface is a surface of each of the light guides, through which surface light emitted from the light source and then traveled inside the light guide is emitted outward. The second emitting surface is similar to an emitting surface of a conventional light guide. A thickness of the each of the light guides in a direction perpendicular to the second emitting surface depends on an angle between the second emitting surface and the reflection surface.

According to the configuration, the second emitting surface is substantially parallel to the irradiated surface (i.e., a surface of a member that faces the second emitting surface and is irradiated with light).

The irradiated surface is for example a surface of a diffusing plate that faces the second emitting surface, a surface of an optical sheet that faces the second emitting surface, or the like. Note, however, that the irradiated surface is not limited to these examples.

The second emitting surface is substantially parallel to the irradiated surface. Accordingly, for example in a case of designing a surface light source device that includes (i) the illumination device in accordance with the present invention and (ii) either of the diffusing plate and the optical sheet each of which has a light diffusing property, it is possible to easily keep constant a distance form the second emitting surface to the diffusing plate or to the optical sheet. This makes it possible to attain an advantage that optical design for uniform plane light emission is easy.

Further, since the light guides overlap each other such that the light guides lean on their neighboring one so as to make an angle to the irradiated surface, the second emitting surface is not parallel to the reflection surface. That is, each of the light guides has a shape in which its thickness decreases as a distance from the light source increases (i.e., as a distance to an edge portion decreases).

With this configuration, as the light travels inside a corresponding one of the light guides toward its edge portion, an angle of incidence of the light gradually becomes smaller than the total reflection critical angle. Eventually, the light is emitted outward through the second emitting surface.

<Explanation for First Emitting Surface>

With the configuration in which the angle between the second emitting surface and the reflection surface of each of the light guides is small, i.e., with the configuration in which the edge portion has a pointed end, it is possible to reduce the thickness of the illumination device.

Note however that, as described earlier, the edge portion of each of the light guides can be sharpened only to a limited extent, in view of ensuring of strength of the light guides and produceability of the light guides.

Further, in order to cause light entered each of the light guides to be efficiently emitted outward through the second emitting surface, it is necessary to keep loss of the light to a minimum in a light guide part region. The light guide part region is defined by (i) an upper surface, part of which is the first emitting surface and (ii) the reflection surface.

In view of this, it is necessary to maintain an amount of the incident light in the light guide part region. To this end, the upper surface and the reflection surface of each of the light guides need to be substantially parallel with each other so that the incident light travels inside the light guide part region while meeting the total reflection condition.

As described above, in order to achieve a thin illumination device with high use efficiency of the light source, each of the light guides needs to have a shape with the above limitations.

In a case where, for the purpose of improving uniformity of luminance, the light guides each having the above shape overlap each other such that the light guides lean on their neighboring one so that their second emitting surfaces are aligned, gaps are formed between respective adjacent ones of the second emitting surfaces of the respective light guides. This is because the edge portion of each of the light guides has a certain thickness. The first emitting surface is part, of the upper surface of a corresponding one of the light guides, which is exposed to outside through a corresponding one of the gaps.

Each of the gaps (first emitting surface) is formed above the light guide part region of a corresponding one of the light guides. Note here that the light guide part region guides light from the light source toward the second emitting surface.

Part of the light guide part region is the first emitting surface region, which is defined by (i) the first emitting surface and (ii) the first part of the reflection surface which is on a side opposite to the irradiated surface.

That is, the first emitting surface and the reflection surface are substantially parallel with each other. Accordingly, the incident light in the first emitting surface region meets the total reflection condition.

According to this configuration, the incident light is totally reflected in the first emitting surface region. Therefore, little light is emitted outward through the first emitting surface.

That is, the first emitting surface looks dark when the light emitting surfaces are viewed as a whole. This contributes to luminance unevenness.

In this regard, according to the configuration of the present invention, each of the light guides is provided with, at least in its first emitting surface region, the diffusing means for diffusing the light. The light diffusely reflected by the diffusing means contains a lot of light components, each of which can strike the first emitting surface with an angle of incidence smaller than the total reflection critical angle. Such light components can be emitted outward through the first emitting surface.

Accordingly, this configuration makes it possible to emit light from the first emitting surface, which has conventionally looked dark and contributed to luminance unevenness. As such, it is possible to achieve a thin illumination device capable of further improving uniformity of luminance in the light emitting surfaces as a whole.

<Explanation for Diffusing Means>

According to the configuration, each of the light guides is provided with the diffusing means at least in its first emitting surface region.

A method of providing the diffusing means in the first emitting surface region of the each of the light guides is not particularly limited, and for example rough surface processing, satin finish, embossing, texturing, printing of diffusing matters, formation of the microprisms, or the like.

Further, for example, the diffusing means can be provided on one surface (a front surface or a back surface) of the each of the light guides, or on both surfaces (front and back surfaces) of the each of the light guides. Note, however, that the region to which the diffusing means is provided is not limited to those described above, and can be any surface of the each of the light guides (i.e., a single surface or two or more surfaces in any combination).

Alternatively, the diffusing means can be provided inside the each of the light guides. A method of providing the diffusing means into the each of the light guides is not particularly limited, and is for example addition of a material having a different refractive index, incorporation of air bubbles by foaming the light guides, or the like.

Further, it is also possible to employ a proper combination of (i) the method of providing the diffusing means into the each of the light guides and (ii) the method of providing the diffusing means on one surface (a front surface or a back surface) of the each of the light guides or the method of providing the diffusing means on both surfaces (front and back surfaces) of the each of the light guides.

According to the configuration in which the each of the light guides is provided with the diffusing means at least in its first emitting surface region, it is possible to increase an amount of light directly emitted outward through the first emitting surface. This is because the light diffused by the diffusing means contains a lot of light components, each of which strikes the first emitting surface with an angle of incidence smaller than the total reflection critical angle that depends on material from which the each of the light guides is made. Accordingly, it is possible to suppress luminance unevenness in the light emitting surfaces as a whole.

That is, according to the above configuration in which (i) there are the first emitting surface and the second emitting surface and (ii) the diffusing means is provided in at least the first emitting surface region, it is possible to achieve a thin illumination device capable of further improving uniformity of luminance in the light emitting surfaces even in a case where gaps are formed between respective adjacent ones of the light emitting surfaces of the respective light guides.

Further, since this configuration makes it possible to achieve an illumination device with high uniformity of luminance even in a case where gaps are formed between respective adjacent ones of the light emitting surfaces of the respective light guides, the edge portion of each of the light guides can be made thinner only to a necessary extent by taking into consideration ensuring of strength of the light guides and easiness of production of the light guides.

Specifically, there is no need to cause the edge portion of each of the light guides to have an extremely sharp end for the purpose of reducing area of the gaps. Accordingly, it is possible to reduce weight of each of the light guides, because weight of an omitted part of the edge portion is saved. Further, it is possible to increase strength of each of the light guides and to easily form each of the light guides, because the edge portion does not have a pointed end.

As such, according to the configuration in which the above light guides are included, it is possible to achieve an illumination device with reduced weight and improved strength and produceability.

The illumination device in accordance with the present invention is preferably configured such that the first emitting surface and the second emitting surface are joined together to form a curve at a place where they are jointed; and the curve is part of a circle inscribed in an angle between the first emitting surface and the second emitting surface.

The description "the first emitting surface and the second emitting surface are joined together to form a curve at a place where they are jointed" means that there is a curved surface between the first emitting surface and the second emitting surface. Specifically, slope of the curved surface with respect to the first and second emitting surfaces continuously varies so that the curved surface forms a smooth curve and the first emitting surface and the second emitting surface are joined smoothly.

According to this configuration, the first emitting surface and the second emitting surface are joined together to form a smooth curve at a place they are jointed, which curve is part of a circle inscribed in an angle between the first emitting surface and the second emitting surface. That is, there is no point of inflexion in a boundary between the first emitting surface and the second emitting surface.

That is, according to the configuration in which the first emitting surface and the second emitting surface are joined together to form a curve at a place where they are jointed, it is possible to prevent a state where (i) a direction of light emitted from the first emitting surface, which is at an angle to the irradiated surface and (ii) a direction of light emitted from the second emitting surface, which is parallel to the irradiated surface greatly differ from each other in the vicinity of the boundary between the first emitting surface and the second emitting surface. This makes it possible to achieve an illumination device in which luminance unevenness in the light emitting surfaces as a whole is further suppressed and thus uniformity of luminance is further improved.

The illumination device in accordance with the present invention is preferably configured such that: the second emitting surface and a second part of the reflection surface define a second emitting surface region of said each of the light guides; and said each of the light guides is further provided with additional diffusing means in the second emitting surface region.

As described earlier, the second emitting surface is not parallel to the reflection surface. That is, the second emitting surface region of the each of the light guides has a shape in which a thickness of the each of the light guides gradually decreases as a distance to the edge portion decreases.

With this configuration, as the light which was not emitted outward through the first emitting surface travels toward the edge portion of the each of the light guides, an angle of incidence of the light gradually becomes smaller than the total reflection critical angle. Eventually, the light is emitted outward through the second emitting surface.

Note however that, in order to cause the light to be more efficiently emitted outward through the second emitting surface, the diffusing means is preferably provided not only in the first emitting surface region but also in the second emitting surface region. A method of providing the diffusing means in the second emitting surface region is same as that of the first emitting surface region. Particularly, a region, of the second emitting surface region, to which the diffusing means is provided can be (i) one surface (a front surface or a back surface) of the each of the light guides, (ii) both surfaces (front and back surfaces) of the each of the light guides, or (iii) inside the each of the light guides. The region can be one of these examples, or any combination of two or more of these examples.

According to the configuration, it is possible to cause light to be more efficiently emitted outward also through the second emitting surface. This makes it possible to further suppress luminance unevenness in the light emitting surfaces as a whole, thereby achieving an illumination device with further improved uniformity of luminance.

The illumination device in accordance with the present invention is preferably configured such that: the diffusing means is provided with different distribution densities according to differences in an amount of light emitted outward over the first emitting surface and the second emitting surface.

According to this configuration, the diffusing means are provided with different distribution densities according to differences in the amount of light emitted outward over the first emitting surface and the second emitting surface of the each of the light guides. With this configuration, for example, it is possible to provide a larger amount of the diffusing means in a region where the amount of light is relatively small, and to provide a smaller amount of the diffusing means in a region where the amount of light is relatively large. This makes it possible to further suppress luminance unevenness in the light emitting surfaces as a whole, thereby achieving an illumination device having more improved uniformity of luminance.

In order to attain the above object, a surface light source device in accordance with the present invention includes: the illumination device; and an optical sheet provided on the light emitting surface of the illumination device.

One example of the optical sheet is a diffusing plate, which is approximately 2 mm to 3 mm in thickness and is provided at a distance of several millimeters from the illumination device. Note, however, that the thickness of the optical sheet and the distance from the illumination device are not limited to those described above.

In order to secure uniformity of luminance that is high enough for the surface light source device to sufficiently exert its function, for example, the diffusing plate can further have, stacked on its upper surface, an optical sheet having a plurality of functions such sheet as a diffusing sheet, a prism sheet, a polarized reflection sheet, or the like, which is approximately several hundreds micrometers in thickness.

The above thickness and configuration are mere examples, and therefore the thickness and configuration are not limited to those described above.

According to the configuration, even in a case where the gaps are formed between respective adjacent ones of the light emitting surfaces of the respective light guides, it is possible to achieve a thin surface light source device capable of further improving uniformity of luminance in the light emitting surfaces.

Further, it is possible to achieve a lightweight surface light source device with improved strength and produce ability.

In order to attain the above object, a liquid crystal display device in accordance with the present invention includes the surface light source device as a backlight.

According to the configuration, the liquid crystal display device includes, as a backlight, the thin surface light source device with excellent uniformity of luminance in the light emitting surfaces. As such, it is possible to achieve a thin liquid crystal display device with excellent display quality.

Further, the liquid crystal display device includes, as a backlight, a lightweight surface light source device with improved strength and produceability. As such, it is possible to achieve a lightweight liquid crystal display with excellent durability and produceability.

Advantageous Effects of Invention

As described so far, the illumination device in accordance with the present invention is configured such that: each of light guides has (i) a reflection surface, which is on a side opposite to an irradiated surface and (ii) a light emitting surface, which is opposite to the reflection surface and is not covered by a neighboring one of the light guides; the light emitting surface is made up of (a) a first emitting surface, which is substantially parallel with the reflection surface and (b) a second emitting surface, which is substantially parallel with the irradiated surface; the first emitting surface and a first part of the reflection surface define a first emitting surface region of said each of the light guides, the first part of the reflection surface being part, of the reflection surface, which is right below the first emitting surface; and said each of the light guides is provided with, at least in the first emitting surface region, diffusing means for diffusing the light.

As described so far, the surface light source device in accordance with the present invention includes: the illumination device; and an optical sheet provided on the light emitting surfaces of the illumination device.

As described so far, the liquid crystal display device in accordance with the present invention includes the surface light source device as a backlight.

Accordingly, it is possible to achieve a thin illumination device capable of further improving uniformity of luminance in the light emitting surfaces even in a case where gaps are formed between respective adjacent ones of the light emitting surfaces of the respective light guides. Further, it is possible to achieve a lightweight illumination device with improved strength and produceability.

Further, it is possible to achieve a thin and lightweight surface light source device including the illumination device, which surface light source device (i) is capable of further improving uniformity of luminance in the light emitting surfaces and (iii) has improved strength and produceability.

Furthermore, it is possible to achieve a thin and lightweight liquid crystal display device including the surface light source device as a backlight, which liquid crystal display device is excellent (i) in display quality and (ii) in durability and produceability.

BRIEF DESCRIPTION OF DRAWINGS

FIG. 11 is a cross-sectional view for describing a shape of a light guide in which an angle between an emitting surface and a reflection surface is further reduced.

DESCRIPTION OF EMBODIMENTS

One example of one embodiment of the present invention is specifically described below with reference to the drawings. Note however that, unless otherwise stated, size, material, shape, positional relation, and the like of each constituent described in the present embodiment are mere examples for explaining the present embodiment, and are not intended to limit the present invention to those described in the present embodiment.

An illumination device of one embodiment in accordance with the present invention is a thin illumination device, which is capable of further improving uniformity of luminance in its light emitting surface even in a case where gaps are formed between respective adjacent ones of light emitting surfaces of respective light guides. Further, the illumination device is lightweight and has improved strength and produceability.

A surface light source device of one embodiment in accordance with the present invention includes the illumination device, thereby achieving a small thickness and further improved uniformity of luminance in its light emitting surface. Further, the surface light source device is lightweight and has improved strength and produceability.

A liquid crystal display device of one embodiment in accordance with the present invention includes the surface light source device as a backlight, thereby achieving a small thickness and high display quality. Further, the liquid crystal display device is lightweight and has excellent durability and produceability. These are described below with reference to FIGS. 1 through 9.

Embodiment 1

Figure 2:
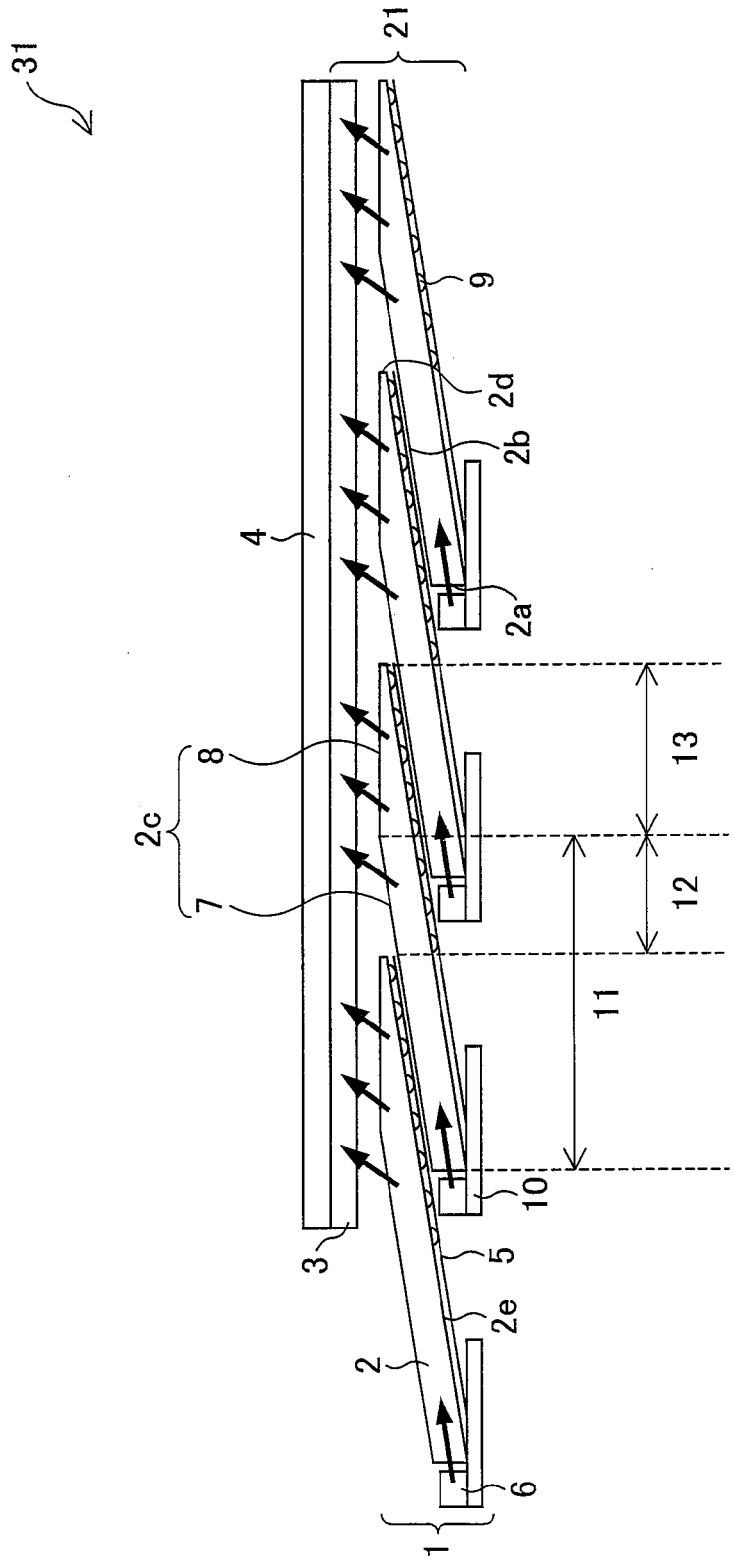
FIG. 2 is a cross-sectional view illustrating how a liquid crystal display device of one embodiment in accordance with the present invention is configured.

FIG. 2 is a cross-sectional view illustrating how a liquid crystal display device 31 of one embodiment of the present invention is configured.

The liquid crystal display device 31 illustrated in FIG. 2 includes a surface light source device 21 (backlight). The surface light source device 21 includes an illumination device 1, in which light guides 2 overlap each other such that the light guides 2 lean on their neighboring one so as to make an angle to a later-described irradiated surface (i.e., a surface of a target to be irradiated). Each of the light guides 2 emits light, which is from a corresponding one of light sources 6, in a form of plane emission.

As illustrated in FIG. 2, the liquid crystal display device 31 includes: a liquid crystal display panel 4; and the surface light source device 21 (backlight) provided behind the liquid crystal display panel 4. The surface light source device 21 (backlight) emits light toward the liquid crystal display panel 4.

Figure 1:
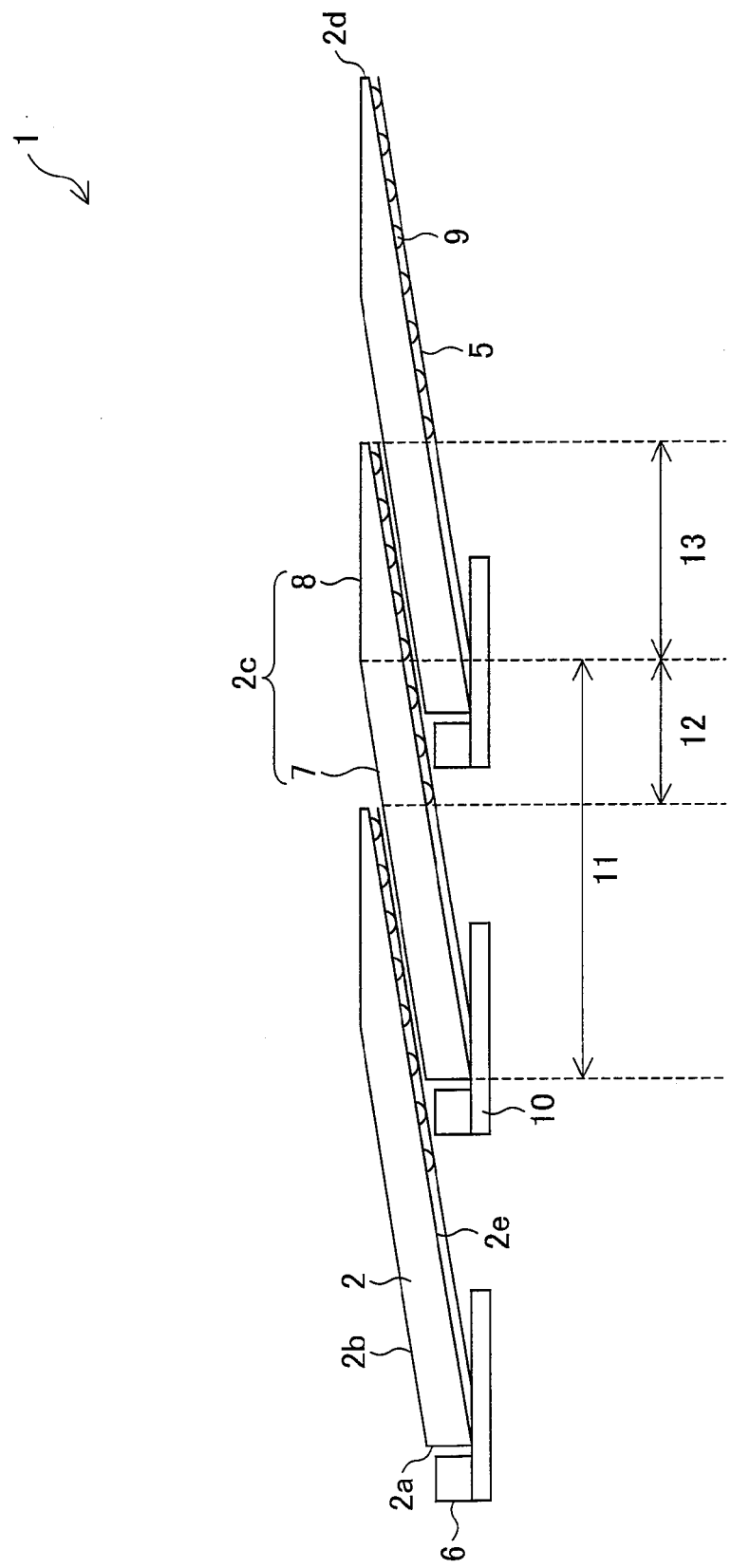
FIG. 1 is an enlarged cross-sectional view illustrating a chief part of an illumination device of one embodiment in accordance with the present invention.

FIG. 1 is a cross-sectional view schematically illustrating how the illumination device 1 included in the liquid crystal display device 31 is configured.

The illumination device 1 is constituted by a plurality of light guide units. Each of the plurality of light guide units includes: a corresponding one of the light guides 2; a corresponding one of reflection sheets 5; a corresponding one of the light sources 6; diffusing means 9; and a substrate 10. The each of the plurality of light guide units is for obtaining plane light emission by diffusing light from the light source 6.

<Light Guide 2>

Each of the light guides 2 causes light from a corresponding one of the light sources 6 to be emitted outward through its emitting surface 8 in a form of plane emission. As illustrated in FIG. 2, the second emitting surfaces 8 face an optical sheet 3 (which is to be irradiated with light), and emit light toward the optical sheet 3. Note here that the optical sheet 3 can be omitted so that the second emitting surfaces 8 directly face the liquid crystal display panel 4.

That is, the foregoing irradiated surface is a back surface of the optical sheet 3 or of the liquid crystal display panel 4, which back surface faces the second emitting surfaces 8. The irradiated surface is substantially parallel with the second emitting surfaces 8. On the other hand, an entire back surface, of each of the light guides 2, which is opposite to a corresponding one of the second emitting surfaces 8 is a reflection surface 2e. The reflection surface 2e is provided with a corresponding one of the reflection sheets 5 so as to prevent light from leaking out through the reflection surface 2e.

A thickness of the illumination device 1 can be reduced by employing the light guides 2 in each of which an angle between its second emitting surface 8 and its reflection surface 2e is small (i.e., an edge portion 2d of each of the light guide 2 has a pointed end).

Note however that, as described earlier, the edge portion 2d of each of the light guides 2 can be sharpened only to a limited extent in view of ensuring of strength of the light guides and easiness of production of the light guides.

Further, in order to cause light, which entered a corresponding one of the light guides 2 through its incidence surface 2a that faces a corresponding one of the light sources 6, to be efficiently emitted outward through a corresponding one of the second emitting surfaces 8, it is necessary to keep loss of the light to a minimum in a light guide part region 11 of the corresponding one of the light guides 2. The light guide part region 11 of each of the light guides 2 is defined by (i) the reflection surface 2e and (ii) an upper surface 2b opposed to the reflection surface 2e.

In view of this, it is necessary to maintain an amount of the incident light in the light guide part region 11. To this end, the upper surface 2b and the reflection surface 2e need to be substantially parallel with each other so that the incident light travels inside the light guide part region 11 while meeting the total reflection condition.

As described above, in order to achieve a thin illumination device, each of the light guides needs to have a shape with the above limitations.

In this regard, according to the present embodiment, the light guides 2 each having the above shape are employed so as to reduce a thickness of the illumination device 1. Further, for the purpose of improving uniformity of luminance, the light guides 2 overlap each other such that the light guides 2 lean on their neighboring one so that the second emitting surfaces 8 of the respective light guides 2 are aligned in a plane.

The light guides 2 can be made from transparent resin such as polycarbonate (PC) or polymethyl methacrylate (PMMA). However, material from which the light guides 2 are made is not limited to those described above, and can be any material generally used as light guides. The light guides 2 can be formed for example by injection molding, extrusion molding, thermal press molding, cutting work, or the like. However, a method of forming the light guides 2 is not limited to those described above, and can be any method as long as a property same as that obtained by those methods can be obtained.

<Second Emitting Surface 8>

A thickness (height) of each of the light guides 2 in a direction perpendicular to a corresponding one of the second emitting surfaces 8 depends on an angle between the second emitting surface 8 and the reflection surface 2e.

As described earlier, the second emitting surfaces 8 are substantially parallel to the optical sheet 3. Accordingly, in a case of designing a surface light source device 21 which (i) includes the illumination device 1 of the present invention and the optical sheet 3 and (ii) uniformly emits light in a form of plain emission, it is possible to easily keep constant a distance between the second emitting surfaces 8 and the optical sheet 3. As such, it is possible to achieve an advantage that optical design for uniform plane light emission is easy.

Further, since the light guides 2 overlap each other such that the light guides 2 lean on their neighboring one so as to make an angle to the irradiated surface, each of the second emitting surfaces 8 is not parallel to the reflection surface 2e. That is, each of the light guides 2 has a shape in which its thickness gradually decreases as a distance from a corresponding one of the light sources 6 increases (i.e., as a distance to the edge portion 2d decreases).

With this configuration, as the light travels inside a corresponding one of the light guides 2 toward the edge portion 2d of the light guide 2, an angle of incidence of the light gradually becomes smaller than the total reflection critical angle. Eventually, the light is emitted outward through a corresponding one of the second emitting surfaces 8.

<First Emitting Surface 7>

In a case where, for the purpose of improving uniformity of luminance, the light guides 2 each having the above shape overlap each other such that (i) the light guides 2 lean on their neighboring one, (ii) their second emitting surfaces 8 are aligned, and (iii) the second emitting surfaces 8 thus aligned are substantially parallel to the irradiated surface, gaps are formed between respective adjacent ones of the second emitting surfaces 8 of the respective light guides 2. This is because the edge portion 2d of each of the light guides 2 has a certain thickness (see FIG. 1). Note here that, part, of the upper surface 2b, which is exposed to outside through a corresponding one of the gaps, serves as a first emitting surface 7.

Each of the gaps (first emitting surfaces 7) is formed above the light guide part region 11 of a corresponding one of the light guides 2. Note here that the light guide part region 11 guides light from a corresponding one of the light sources 6 toward a corresponding one of the second emitting surfaces 8.

Part of the light guide part region 11 is a first emitting surface region 12. The first emitting surface region 12 is defined by (i) a corresponding one of the first emitting surfaces 7 and (ii) a first part of the reflection surface 2e that is on a side opposite to the irradiated surface. The first part of the reflection surface 2e is right below the first emitting surface 7. As illustrated in FIG. 1, a cross-sectional surface of the first emitting surface region 12 is in a shape of a parallelogram, in which the first emitting surface 7 and the first part of the reflection surface 2e serve as opposite sides.

That is, the first emitting surface 7 and the reflection surface 2e are also substantially parallel with each other. According to this configuration, the incident light meets the total reflection condition also in the first emitting surface region 12.

According to this configuration, the incident light is totally reflected in a region where there is a corresponding one of the first emitting surfaces 7. Therefore, little light is emitted outward through the first emitting surface 7.

That is, the first emitting surfaces 7 look dark when light emitting surfaces 2c are viewed as a whole. This contributes to luminance unevenness.

In this regard, according to the present embodiment, each of the light guides 2 is provided with microprisms 9 (described later) in its first emitting surface region 12 and second emitting surface region 13 (see FIGS. 1 and 2). Such microprisms 9 are provided on the reflection surface 2e of the each of the light guides 2, and serve as diffusing means.

Although the microprisms 9 serving as the diffusing means are provided on the reflection surface 2e of each of the light guides 2 in the present embodiment, types and positions of the diffusing means are not limited to those described above. Alternatively, later-described any type of diffusing means can be provided on any surface or inside of each of the light guides 2, depending on the situation.

The light diffusely reflected by each of the microprisms 9 contains a lot of light components, each of which can strike a corresponding one of the first emitting surfaces 7 with an angle of incidence smaller than the total reflection critical angle. Such light components can be emitted outward through the first emitting surface 7.

Accordingly, this configuration makes it possible to emit light from the first emitting surfaces 7, which have conventionally looked dark and contributed to luminance unevenness. As such, it is possible to achieve a thin illumination device 1 capable of further improving uniformity of luminance in the light emitting surfaces 2c.

<Explanation for Diffusing Means>

For this reason, each of the light guides 2 is provided with the diffusing means at least in its first emitting surface region 12.

A method of providing the diffusing means in the first emitting surface region 12 is not particularly limited, and for example rough surface processing, satin finish, embossing, texturing, printing of diffusing matters, formation of the microprisms 9, or the like.

In the present embodiment, the microprisms 9 are provided as the diffusing means. The microprisms 9 are made from resin, and formed by being injection-molded onto a corresponding one of the light guides 2.

Figure 6:
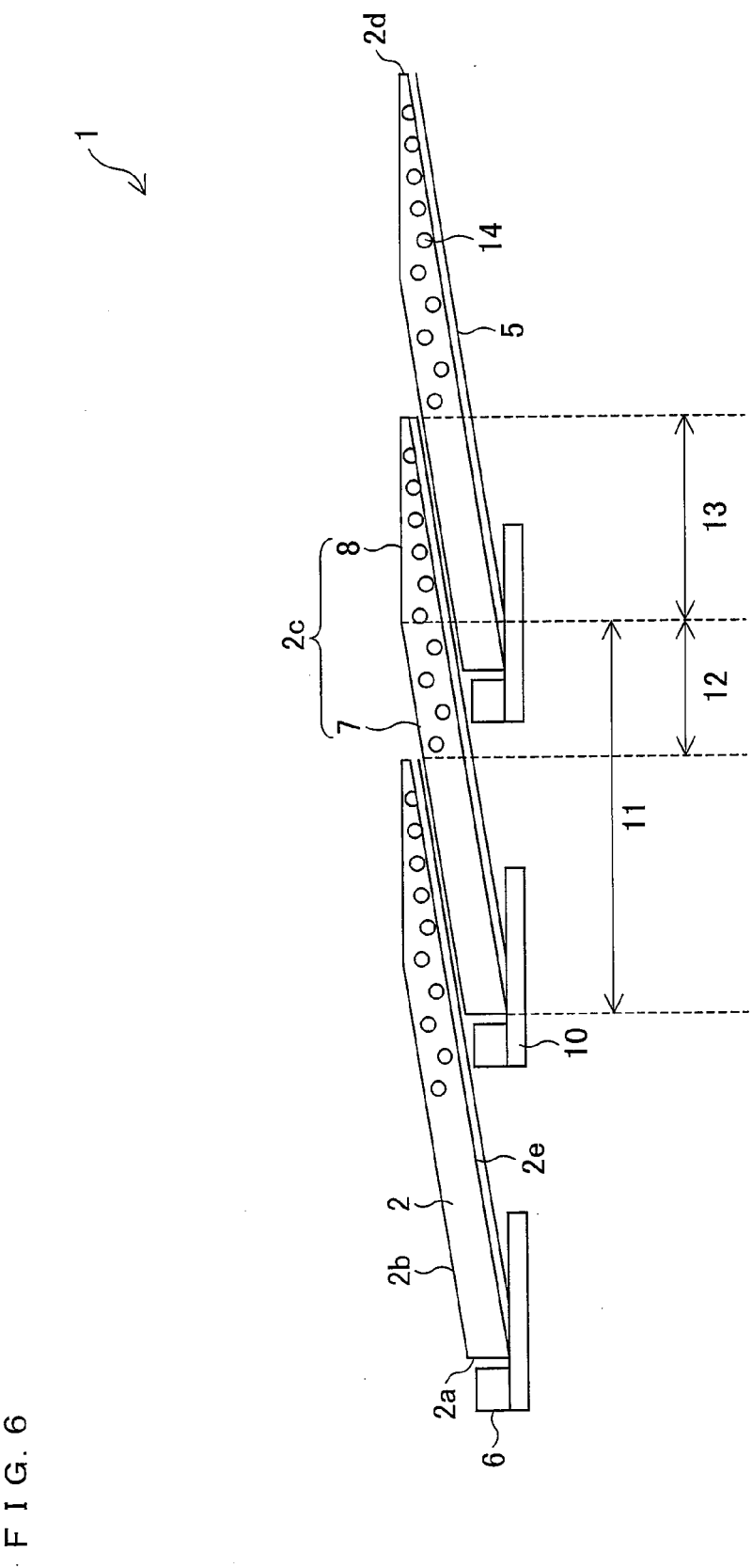
FIG. 6 is a cross-sectional view illustrating a further exemplary configuration in which diffusing means is provided in an illumination device of another embodiment in accordance with the present invention.

Further, the diffusing means can be provided inside each of the light guides 2 (refer to FIG. 6). A method of providing the diffusing means into each of the light guides 2 is not particularly limited, and is for example addition of a material having a different refractive index, incorporation of air bubbles by foaming the light guides 2, or the like.

Further, it is also possible to employ a proper combination of (i) the method of providing the diffusing means into each of the light guides 2 and (ii) the method of providing the diffusing means on one surface of each of the light guides 2 or the method of providing the diffusing means on both surfaces etc. of each of the light guides 2.

According to the configuration in which each of the light guides 2 is provided with the diffusing means at least in its first emitting surface region 12, it is possible to increase an amount of light directly emitted outward through a corresponding one of the first emitting surfaces 7. This is because the light diffused by the diffusing means contains a lot of light components, each of which strikes the first emitting surface 7 with an angle of incidence smaller than the total reflection critical angle that depends on material from which the each of the light guides 2 is made. Accordingly, it is possible to suppress luminance unevenness in the light emitting surfaces 2c as a whole.

On the other hand, as the light which was not emitted outward through a corresponding one of the first emitting surfaces 7 travels toward the edge portion 2d of a corresponding one of the light guides 2, an angle of incidence of the light gradually becomes smaller than the total reflection critical angle. Eventually, the light is emitted outward through a corresponding one of the second emitting surfaces 8.

Note however that, in order to cause the light to be more efficiently emitted outward through the second emitting surfaces 8, the diffusing means is preferably provided not only in the first emitting surface region 12 but also in the second emitting surface region 13. The second output region 13 is defined by (i) a corresponding one of the second emitting surfaces 8 and (ii) a second part of the reflection surface 2e that is on a side opposite to the irradiated surface. The second part of the reflection surface 2e is part, of the reflection surface 2e, which is right below the second emitting surface 8. As illustrated in FIG. 1, a cross-sectional surface of the second emitting surface region 13 is in a shape of an approximate right-angled triangle, in which the second emitting surface 8 serves as one side and the second part of the reflection surface 2e serves as the oblique side.

Figure 3:
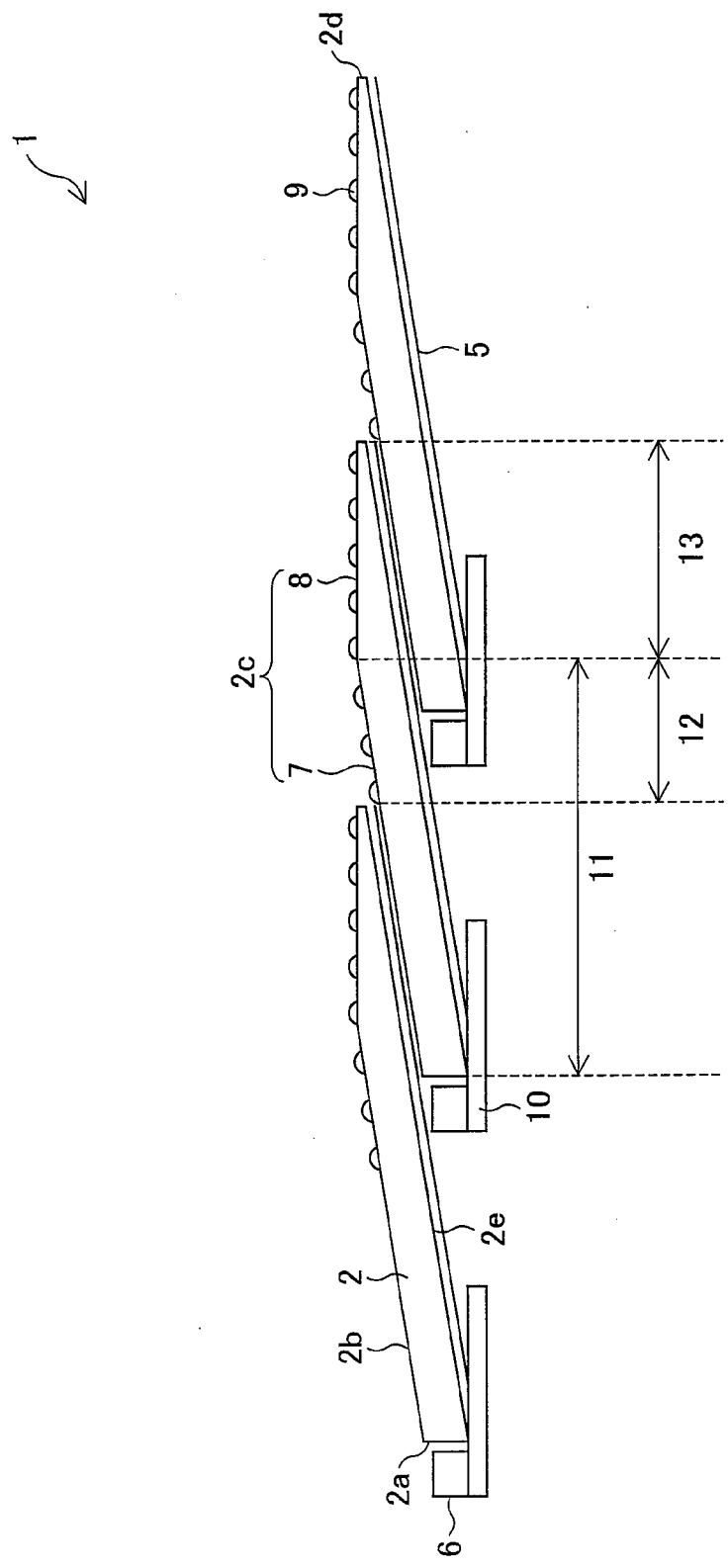
FIG. 3 is a cross-sectional view illustrating an exemplary configuration in which diffusing means is provided in the illumination device of one embodiment in accordance with the present invention.
Figure 4:
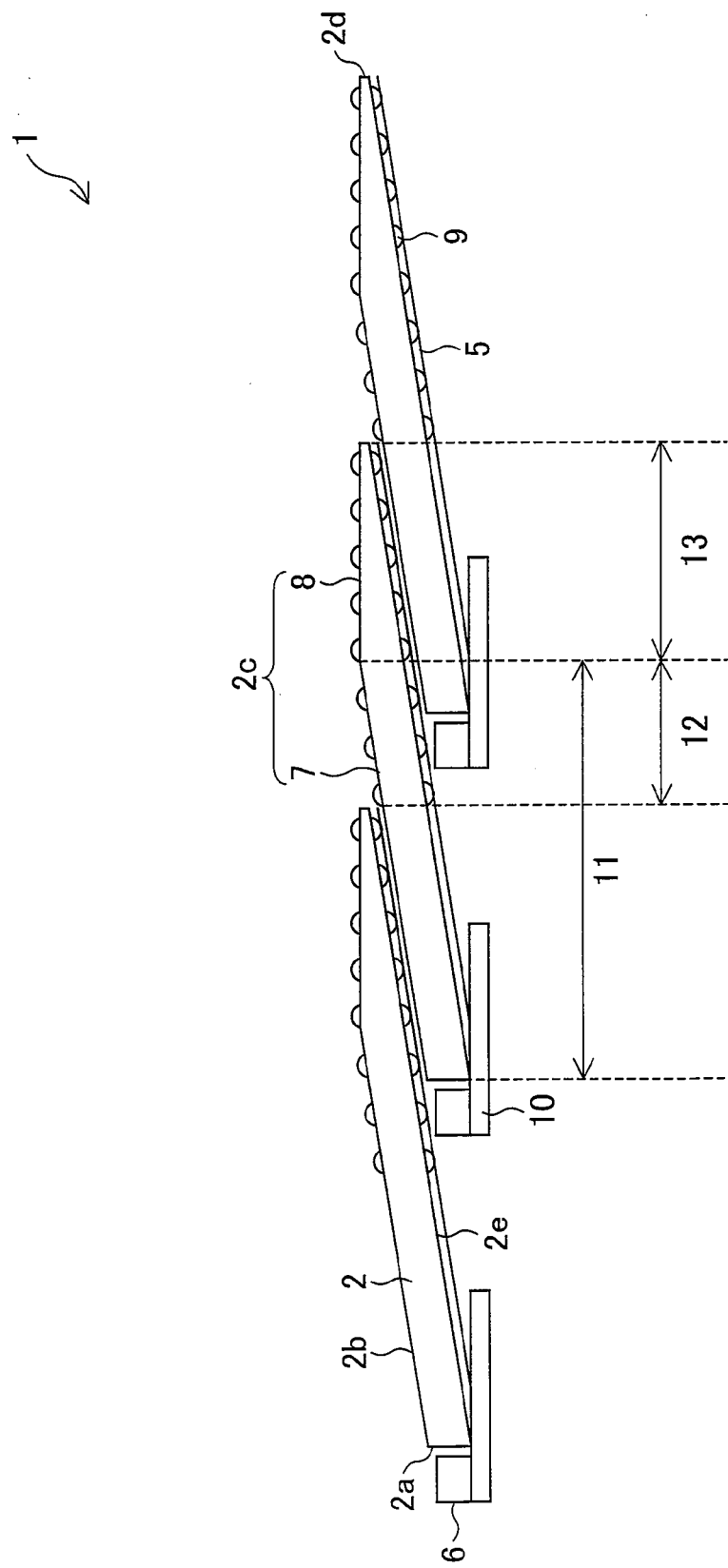
FIG. 4 is a cross-sectional view illustrating another exemplary configuration in which diffusing means is provided in the illumination device of one embodiment in accordance with the present invention.

The following description discusses, with reference to FIGS. 1, 3, and 4, one example of an illumination device 1 in which the diffusing means is provided.

FIG. 1 illustrates the illumination device 1, in which the microprisms 9 serving as the diffusing means are provided in the first emitting surface region 12 and the second emitting surface region 13 of each of the light guides 2. Such microprisms 9 are provided on the reflection surface 2e of the each of the light guides 2. The microprisms 9 need to be provided at least in the first emitting surface region 12, but are preferably provided also in the second emitting surface region 13 in view of uniformity of luminance in the second emitting surfaces 8. This applies also to the following modifications.

FIG. 3, showing an illumination device 1, is a cross-sectional view illustrating a modification of how to provide the diffusing means.

According to the illumination device 1 of FIG. 3, the microprisms 9 serving as the diffusing means are provided on each of the first emitting surfaces 7 and each of the second emitting surfaces 8.

FIG. 4, showing an illumination device 1, is a cross-sectional view illustrating another modification of how to provide the diffusing means.

According to the illumination device 1 of FIG. 4, the microprisms 9 serving as the diffusing means are provided in the first emitting surface region 12 and in the second emitting surface region 13. Such microprisms 9 are provided (i) on each of the first emitting surfaces 7 and part, of the reflection surface 2e, which is opposed to the first emitting surface 7 and (ii) on each of the second emitting surfaces 8 and part, of the reflection surface 2e, which is opposed to the second emitting surface 8.

As illustrated in FIGS. 1, 3, and 4, the diffusing means can be provided on one surface or both surfaces of each of the light guides 2. However, regions to which the diffusing means is provided is not limited to those described above, and can be any surface (i.e., a single surface or two or more surfaces in any combination).

According to this configuration, it is possible to cause light to be more efficiently emitted outward also through the second emitting surfaces 8. This makes it possible to achieve an illumination device 1 in which luminance unevenness in the light emitting surfaces 2c as a whole is further suppressed and thus uniformity of luminance is further improved.

Further, the diffusing means can be provided with different distribution densities according to differences in an amount of light emitted outward over a corresponding one of the first emitting surfaces 7 and a corresponding one of the second emitting surfaces 8 (i.e., over a corresponding one of the light emitting surfaces 2c).

Figure 5:
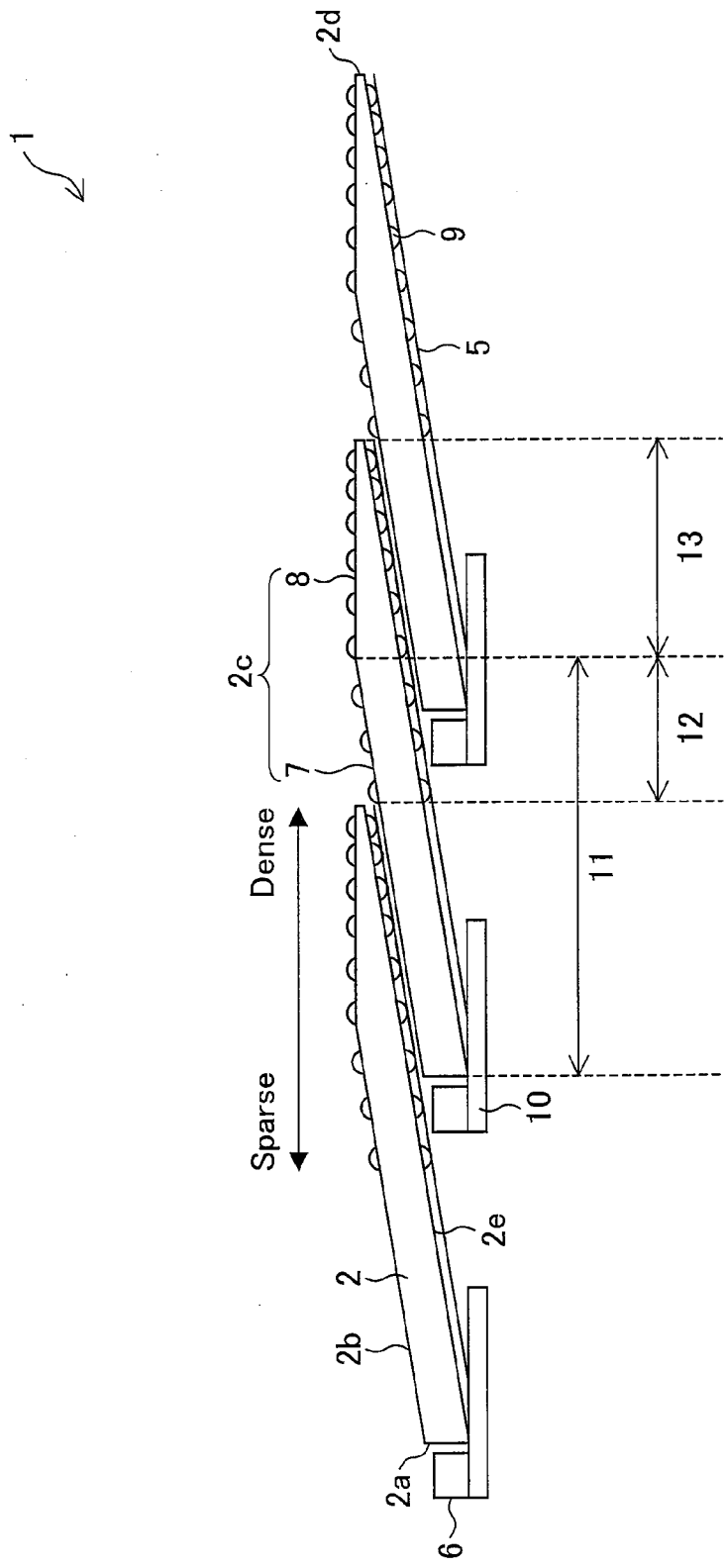
FIG. 5 is a cross-sectional view illustrating an exemplary configuration in which the diffusing means is provided with different distribution densities in the illumination device of one embodiment in accordance with the present invention.

FIG. 5, showing an illumination device 1, is a cross-sectional view illustrating a further modification of how to provide the diffusing means.

According to the illumination device 1 of FIG. 5, the microprisms 9 serving as the diffusing means are provided in the first emitting surface region 12 and in the second emitting surface region 13. Such microprisms 9 are provided (i) on each of the first emitting surfaces 7 and part, of the reflection surface 2e, which is opposed to the first emitting surface 7 and (ii) on each of the second emitting surfaces 8 and part, of the reflection surface 2e, which is opposed to the second emitting surface 8. The microprisms 9 are provided with different distribution densities according to differences in an amount of light emitted outward over a corresponding one of the light emitting surfaces 2c.

For example, the microprisms 9 serving as the diffusing means are provided sparsely in a region closer to a corresponding one of the light sources 6, and densely in a region farther from the light source 6. Note in FIG. 5 that, although the distribution density of the microprisms 9 varies within a region made up of the first emitting surface region 12 and the second emitting surface region 13 from sparse to dense as a distance from the light source 6 increases, the manner of providing the microprisms 9 is not limited to this. That is, the distribution density of the microprisms 9 can vary from sparse to dense within each of the first emitting surface region 12 and the second emitting surface region 13 according to different light emitting properties of the first emitting surface region 12 and the second emitting surface region 13. Further, rate of change of the distribution density in the first emitting surface region 12 and that in the second emitting surface region 13 can either be identical or different from each other, according to the difference between the light emitting properties of the first emitting surface region 12 and the second emitting surface region 13.

According to this configuration, the diffusing means are provided in a surface with different distribution densities according to differences in an amount of light emitted outward over the first emitting surface 7 and the second emitting surface 8 (i.e., over the light emitting surface 2c) of each of the light guides 2. With this configuration, for example, it is possible to provide a larger amount of the diffusing means in a region where the amount of light is relatively small, and to provide a smaller amount of the diffusing means in a region where the amount of light is relatively large. This makes it possible to further suppress luminance unevenness in the light emitting surfaces 2c as a whole, thereby achieving an illumination device 1 having more improved uniformity of luminance.

With the above configuration in which the diffusing means are provided at least in the first emitting surface region 12, it is possible to achieve a thin illumination device 1, which is capable of improving uniformity of luminance in the light emitting surfaces 2c even if the gaps (the first emitting surfaces 7) are formed between respective adjacent ones of the second emitting surfaces 8 of the respective light guides 2.

Since it is possible to achieve an illumination device 1 having high uniformity of luminance even if the gaps (the first emitting surfaces 7) are formed between respective adjacent ones of the second emitting surfaces 8 of the respective light guides 2, the edge portion 2d of each of the light guides 2 needs to be made thinner only to reduce a thickness of the illumination device 1.

Specifically, there is no need to cause the edge portion 2d of each of the light guides 2 to have an extremely sharp end for the purpose of reducing area of the gaps (the first emitting surfaces 7). Accordingly, it possible to reduce weight of each of the light guides 2, because weight of an omitted part of the edge portion 2d is saved. Further, it is possible to increase strength of the light guides 2 and to easily form the light guides 2, because the edge portion 2d does not have a pointed end.

Since the illumination device 1 includes the above light guides 2, weight of the illumination device 1 can be reduced and strength and produceability of the illumination device 1 can be improved.

The following description further discusses, with reference to FIG. 2, the foregoing liquid crystal display device 31 of the present embodiment.

Each of the light sources 6 is provided along an end, of the light guide part region 11, which is farthermost from the edge portion 2d of a corresponding one of the light guides 2. The light sources 6 are not limited to a particular kind. Note here that, in the present embodiment, each of the light sources 6 includes light emitting diodes (LED) each of which is a dot light source.

Each of the light sources 6 can include light emitting diodes of different kinds, which emit light of different colors. Specifically, each of the light sources 6 is configured such that a plurality of groups of LEDs are arranged, each of which groups includes light emitting diodes of three colors (i.e., red [R], green [G], and blue [B]). With such light sources 6 each of which includes a combination of the light emitting diodes of three colors, it is possible for the light emitting surfaces 2c to emit white light.

Note here that, which colors to combine can be determined as needed depending on (i) color characteristics of the light emitting diodes of respective colors, (ii) a color characteristic, of the surface light source device 21, which is desired for an intended use of the liquid crystal display device 31, and (iii) the like. As an alternative, it is possible to employ side emitting LEDs configured such that LED chips of respective different colors are molded into a single package. With such side emitting LEDs, it is possible to achieve an illumination device 1 capable of reproducing a wide range of colors.

According to the present embodiment, the liquid crystal display panel 4 is a transmissive liquid crystal display panel, which transmits light from the surface light source device 21 (backlight) so as to carry out a display.

The liquid crystal display panel 4 is not particularly limited in its configuration, and can be any of generally-known liquid crystal display panels depending on the situation. For example, the liquid crystal display panel 4 is constituted by, although not illustrated, (i) an active matrix substrate on which a plurality of TFTs (thin film transistors) are provided, (ii) a color filter substrate facing the active matrix substrate, and (iii) a liquid crystal layer that is provided between the active matrix substrate and the color filter substrate and is sealed with use of a sealing agent.

The substrate 10 is a substrate on which the light sources 6 are provided, and is preferably a white substrate so as to increase luminance. Note here that, although not illustrated, the substrate 10 has, on its back surface (i.e., a surface opposite to a surface on which the light sources 6 are mounted), drivers for controlling lighting of the LEDs included in the light sources 6. That is, the drivers are mounted on the substrate 10 on which the LEDs are also mounted. According to the configuration in which the drivers and the LEDs are mounted on the same substrate, the number of substrates and the number of connectors connecting the substrates etc. can be reduced. This makes it possible to reduce costs of the device. In addition, since the number of substrates is small, it is possible to reduce a thickness of the liquid crystal display device 31.

Each of the reflection sheets 5 is provided so that it makes contact with the reflection surface 2e of a corresponding one of the light guides 2, in such a way that an end of the each of the reflection sheets 5 is sandwiched between the substrate 10 and an edge portion of the light guide 2. Each of the reflection sheets 5 reflects light so that the light is efficiently emitted outward through a corresponding one of the light emitting surfaces 2c.

The optical sheet 3 is constituted by a diffusing plate and an optical sheet having a plurality of functions. The plurality of functions of the optical sheet are selected from various optical functions such as diffusion, refraction, collection of light, and polarization of light.

One example of the optical sheet 3 is a diffusing plate, which is approximately 2 mm to 3 mm in thickness and is provided at a distance of several millimeters from the illumination device 1. Note, however, that the thickness of the diffusing plate and the distance from the illumination device 1 are not limited to those described above.

The diffusing plate is provided so as to (i) cover an entire surface of the light emitting surfaces 2c each of which is made up of the first emitting surface 7 and the second emitting surface 8, at a distance from the light emitting surfaces 2c and (ii) face the light emitting surface 2c. The diffusing plate diffuses light emitted from the light emitting surfaces 2c.

In order to secure uniformity of luminance that is enough for the surface light source device 21 to sufficiently exert its function, for example, the diffusing plate can further have, stacked on its upper surface, an optical sheet having a plurality of functions such sheet as a diffusing sheet, a prism sheet, a polarized reflection sheet, or the like, which is approximately several hundreds micrometers in thickness.

The above thickness and configuration are mere examples, and therefore the thickness and configuration are not limited to those described above.

The optical sheet having the plurality of functions is made by stacking a plurality of sheets on top of each other on a front surface-side of the light guides 2. The optical sheet having the plurality of functions uniformizes and collects light emitted from the light emitting surfaces 2c of the light guides 2, so as to direct the light toward the liquid crystal display panel 4.

That is, examples of the optical sheet having the plurality of functions encompass: a diffusing sheet that collects and diffuses light; a lens sheet that converges light so as to increase luminance in a front direction (i.e., a direction toward the liquid crystal display panel 4); a polarized reflection sheet that reflects one polarization component of light and transmits the other polarization component of the light so as to increase luminance of the liquid crystal display device 31, and the like. These optical sheets having the plurality of functions are preferably used in an appropriate combination depending on an intended price and performance of the liquid crystal display device 31.

Embodiment 2

Figure 7:
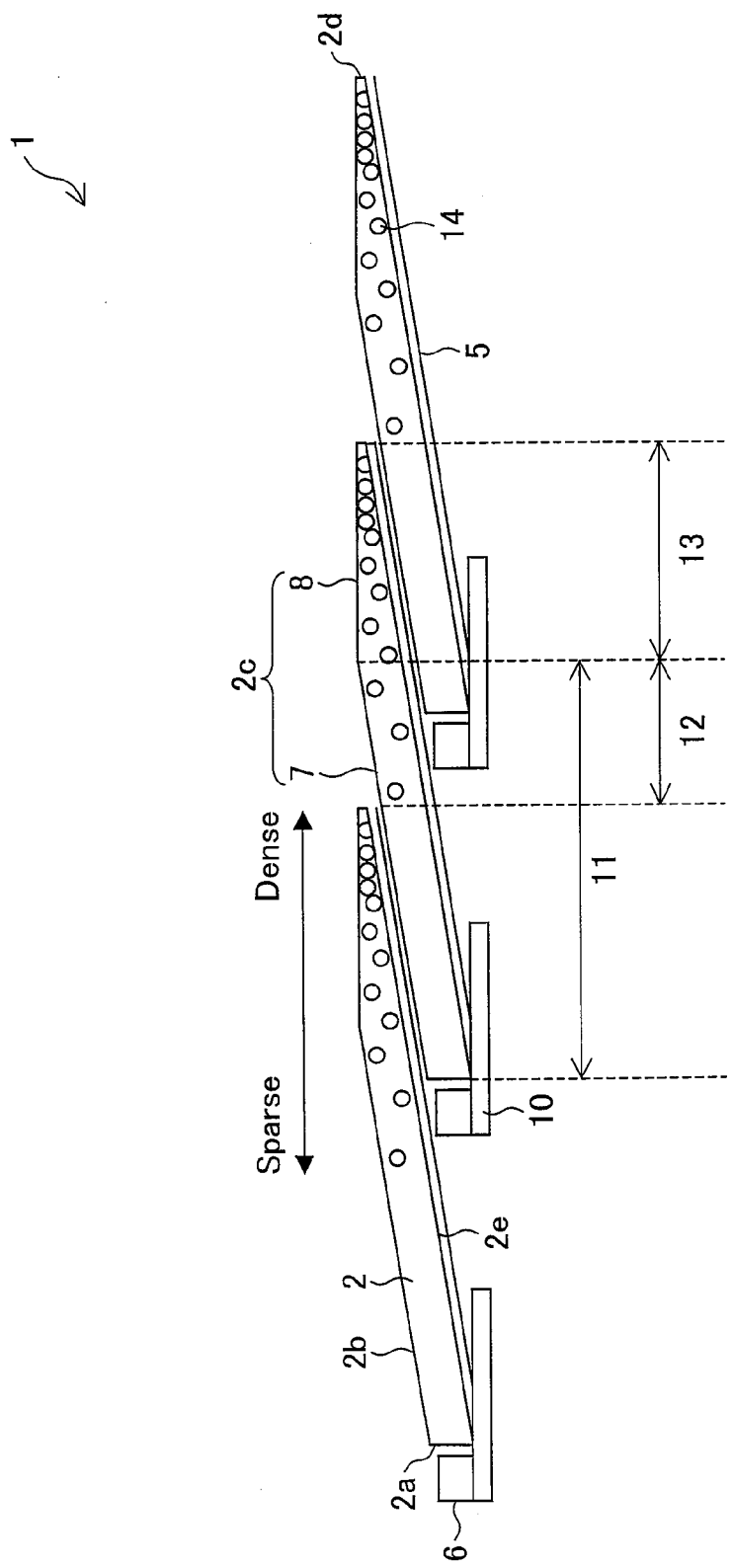
FIG. 7 is a cross-sectional view illustrating another exemplary configuration in which the diffusing means is provided with different distribution densities in the illumination device of another embodiment in accordance with the present invention as shown in FIG. 6.

The following description discusses a second embodiment of the present invention with reference to FIGS. 6 and 7. Note here that configurations other than a configuration described in the present embodiment are same as those described in Embodiment 1. For convenience of description, members having functions identical to those illustrated in the drawings of Embodiment 1 are assigned identical referential numerals, and their descriptions are omitted here.

FIG. 6 is a cross-sectional view illustrating how an illumination device 1 of another embodiment in accordance with the present invention is configured.

As illustrated in FIG. 6, according to the illumination device 1, diffusing members 14 serving as the diffusing means are provided inside each of the light guides 2. Such diffusing members 14 are uniformly provided in the first emitting surface region 12 and the second emitting surface region 13.

A method of providing the diffusing means into each of the light guides 2 is not particularly limited, and is for example addition of a material having a different refractive index, incorporation of air bubbles by foaming the light guides 2, or the like.

According to this configuration, means for diffusing light is provided inside each of the light guides 2. Specifically, the diffusing members 14 serving as the diffusing means are provided inside each of the light guides 2 in such a way that the diffusing members 14 are uniformly provided in the first emitting surface region 12 and the second emitting surface region 13 as illustrated in FIG. 6. This makes it possible to achieve a state that the light diffused by the diffusing members 14 contains a lot of light components, each of which strikes a corresponding one of the light emitting surfaces 2c with an angle of incidence smaller than the total reflection critical angle that depends on material from which the each of the light guides 2 is made.

Accordingly, it is possible to increase an amount of light to be directly emitted outward through the first emitting surfaces 7. Further, it is possible to cause light to be efficiently emitted outward through the second emitting surfaces 8. As such, it is possible to achieve an illumination device 1 in which luminance unevenness in the light emitting surfaces 2c as a whole is further suppressed and thus uniformity of luminance is further improved.

FIG. 7 is a cross-sectional view illustrating an illumination device 1, which is a modification of the foregoing illumination device.

As illustrated in FIG. 7, according to the illumination device 1, the diffusing members 14 serving as the diffusing means are provided inside each of the light guides 2. Such diffusing members 14 are provided in the first emitting surface region 12 and the second emitting surface region 13 with different distribution densities according to differences in an amount of light emitted outward over a corresponding one of the first emitting surfaces 7 and a corresponding one of the second emitting surfaces 8.

The diffusing members 14 are provided with different distribution densities according to differences in an amount of light emitted outward over a corresponding one of the first emitting surfaces 7 and a corresponding one of the second emitting surfaces 8. In view of this, for example, it is possible to provide a larger number of the diffusing members 14 in a region where the amount of light is relatively small and to provide a smaller number of the diffusing members 14 in a region where the amount of light is relatively large.

According to this configuration, an increased amount of light is diffused by the diffusing members 14 in a region where the amount of light is relatively small within the first emitting surface 7 and the second emitting surface 8. This makes it possible to further improve uniformity of luminance in the first emitting surface 7 and the second emitting surface 8, thereby achieving an illumination device 1 in which uniformity unevenness is further suppressed.

Embodiment 3

Figure 8:
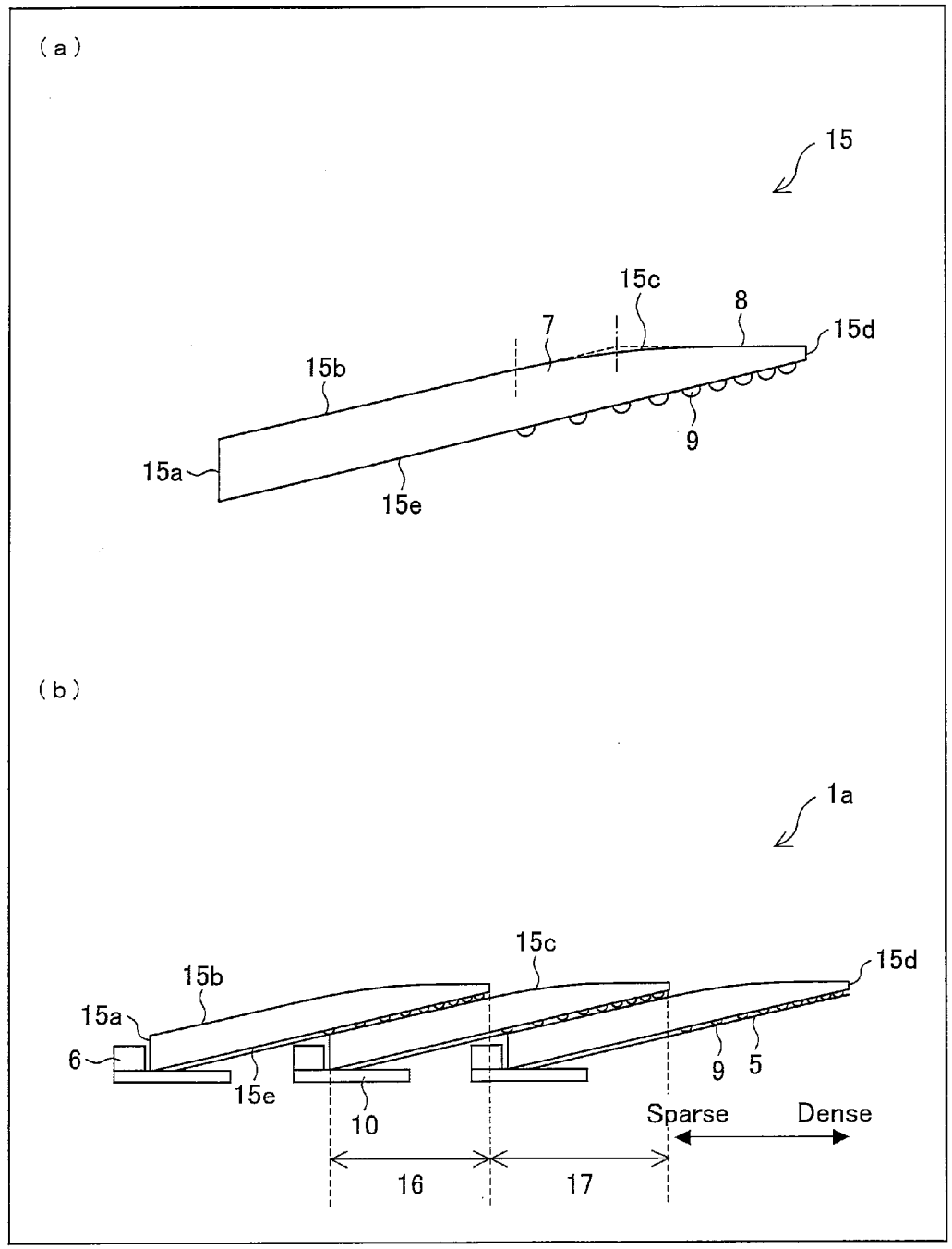
FIG. 8 shows cross-sectional views each of which illustrates an illumination device of a further embodiment in accordance with the present invention. (a) of FIG. 8 illustrates a light guide included in the illumination device. (b) of FIG. 8 illustrates the illumination device constituted by the light guide.
Figure 9:
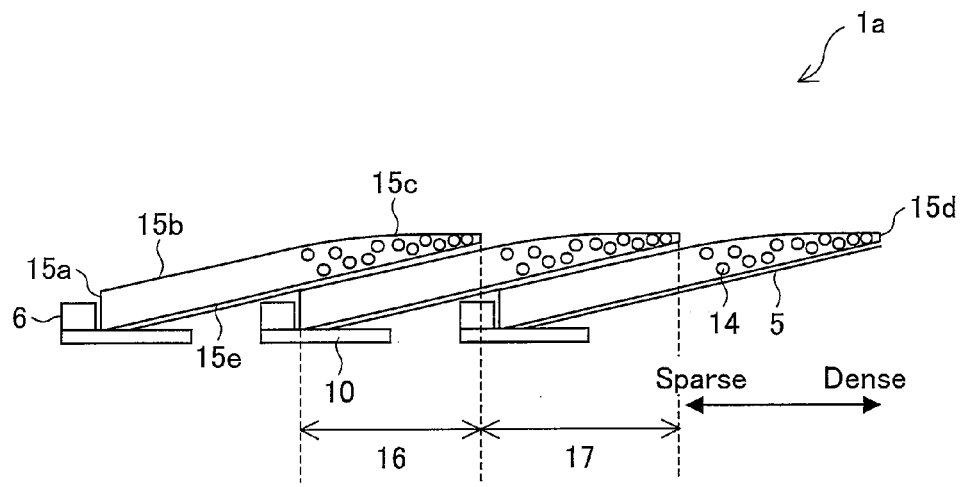
FIG. 9 is a cross-sectional view illustrating a further exemplary configuration in which the diffusing means is provided with different distribution densities in the illumination device of a further embodiment in accordance with the present invention as shown in FIG. 8.
Figure 10:
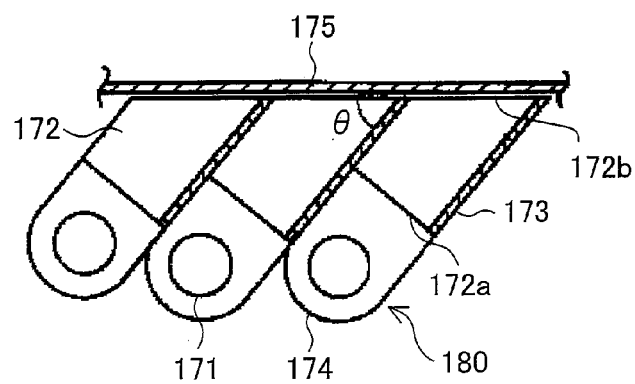
FIG. 10 is a partial cross-sectional view illustrating how an illumination device of a conventional art is configured.
Figure 12:
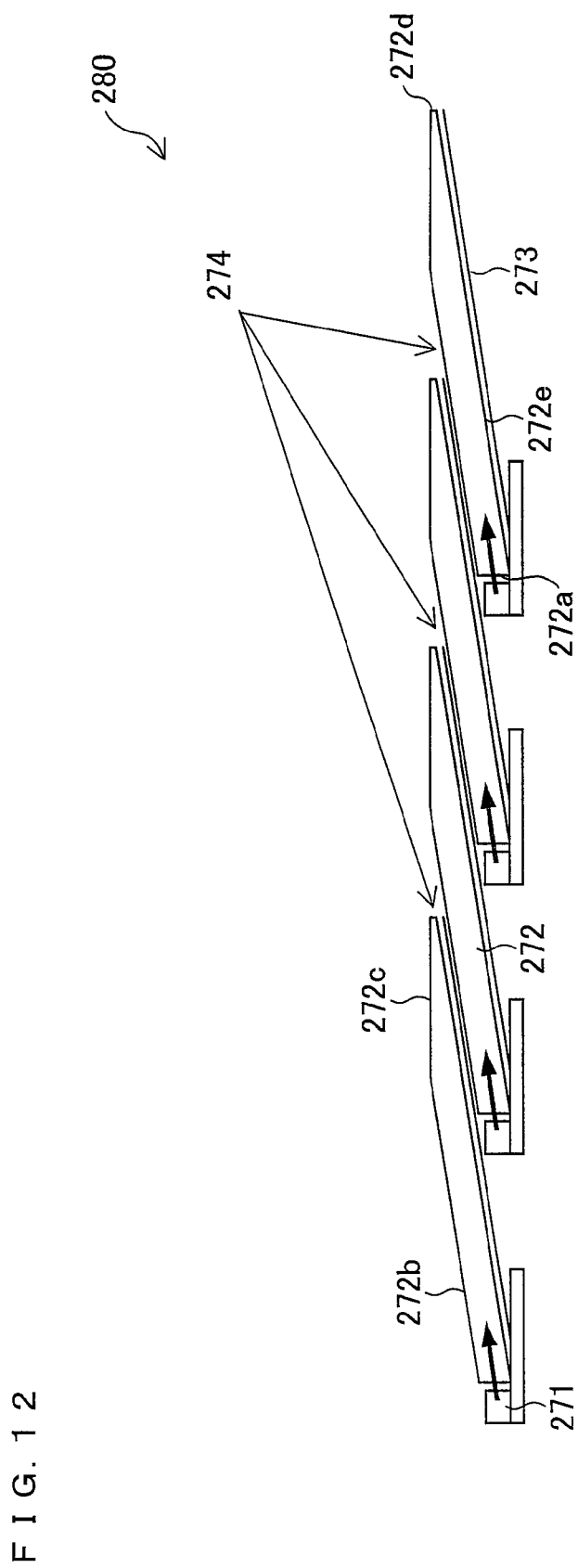
FIG. 12 is a cross-sectional view illustrating a configuration of an illumination device in which light guides as shown in FIG. 11 overlap each other such that the light guides lean on their neighboring one so that their emitting surfaces are aligned.

The following description discusses a third embodiment of the present invention with reference to FIGS. 8 and 9. Note here that configurations other than a configuration described in the present embodiment are same as those described in Embodiment 1. For convenience of description, members having functions identical to those illustrated in the drawings of Embodiment 1 are assigned identical referential numerals, and their descriptions are omitted here.

(a) of FIG. 8 illustrates one of light guides 15 of a further embodiment in accordance with the present invention. (b) of FIG. 8 illustrates an illumination device 1a constituted by the light guides 15 of (a) of FIG. 8.

As illustrated in (a) and (b) of FIG. 8, the illumination device 1a of the present embodiment has light emitting surfaces 15c. Each of the light emitting surfaces 15c is made up of a corresponding one of the first emitting surfaces 7 and a corresponding one of the second emitting surfaces 8, which are joined together so that a corner of a resulting light emitting surface 15c is curved along a circle inscribed in an angle between the first emitting surface 7 and the second emitting surface 8. More specifically, the first emitting surface 7 and the second emitting surface 8 are joined together to form a curve at a place where they are jointed, which curve is part of the circle inscribed in the angle between the first emitting surface 7 and the second emitting surface 8.

Further, as illustrated in (b) of FIG. 8, the microprisms 9 serving as the diffusing means are provided on a reflection surface 15e of each of the light guides 15. Such microprisms 9 are provided in a light emitting surface region 17 of the each of the light guides 15, which region is defined by (i) a corresponding one of the first emitting surfaces 7 and a corresponding one of the second emitting surfaces 8 and (ii) part of the reflection surface 15e, which is right below the first emitting surface 7 and the second emitting surface 8. The microprisms 9 are provided with different distribution densities according to differences in an amount of light emitted outward over a corresponding one of the light emitting surfaces 15c.

FIG. 9 illustrates an illumination device 1a of a further embodiment in accordance with the present invention.

As illustrated in FIG. 9, the diffusing members 14 serving as the diffusing means are provided inside each of the light guides 15. Such diffusing members 14 are provided in the light emitting surface region 17. The diffusing members 14 are provided with different distribution densities according to differences in an amount of light emitted outward over a corresponding one of the light emitting surfaces 15c.

The description "the first emitting surface 7 and the second emitting surface 8 are joined together to form a curve at a place where they are jointed" means that there is a curved surface between the first emitting surface 7 and the second emitting surface 8. Specifically, slope of the curved surface with respect to the first emitting surface 7 and to the second emitting surface 8 continuously varies so that the curved surface forms a smooth curve and the first emitting surface 7 and the second emitting surface 8 are joined smoothly.

According to this configuration, each of the first emitting surfaces 7 and a corresponding one of the second emitting surfaces 8 are joined together to form a smooth curve at a place where they are jointed, which curve is part of a circle inscribed in the angle between the first emitting surface 7 and the second emitting surface 8. That is, there is no point of inflexion in a boundary between the first emitting surface 7 and the second emitting surface 8.

If there is a point of inflexion on a surface, then slope of the surface abruptly changes at the point of inflexion. In this case, a light path greatly differs between regions adjacent to each other across the point of inflexion. If there are such regions, luminance of the regions looks differently when the light emitting surfaces are viewed from a certain angle.

In this regard, according to the configuration in which each of the first emitting surfaces 7 and a corresponding one of the second emitting surfaces 8 are joined together to form a curve at a place where they are jointed, it is possible to prevent a state where (i) a direction of light emitted from the first emitting surface 7 that is at an angle to the irradiated surface and (ii) a direction of light emitted from the second emitting surface 8 that is parallel to the irradiated surface greatly differ from each other in the vicinity of the boundary between the first emitting surface 7 and the second emitting surface 8. This makes it possible to achieve an illumination device 1a in which luminance unevenness in the light emitting surfaces as a whole is further suppressed and thus uniformity of luminance is further improved.

The invention is not limited to the description of the embodiments above, but may be altered within the scope of the claims. An embodiment based on a proper combination of technical means disclosed in different embodiments is encompassed in the technical scope of the invention.

INDUSTRIAL APPLICABILITY

The present invention is applicable to (i) an illumination device used as a backlight of a liquid crystal display device etc., (ii) a surface light source device including the illumination device, and (iii) a liquid crystal display device including the surface light source device.

REFERENCE SIGNS LIST

1 Illumination device
2, 15 Light guide 2c, 15c Light emitting surface
2e, 15e Reflection surface
3 Optical sheet
6 Light source
7 First emitting surface
8 Second emitting surface
9 Microprism (diffusing means)
12 First emitting surface region
13 Second emitting surface region
14 Diffusing member (diffusing means)
21 Surface light source device
31 Liquid crystal display device

The invention claimed is:

1. An illumination device, comprising:
a plurality of groups each including (i) a light source and (ii) a light guide arranged to obtain plane light emission by diffusing light from the light source,
the light guides overlapping each other such that the light guides lean on their neighboring one so as to make an angle to an irradiated surface,
each of the light guides including (i) a reflection surface, which is on a side opposite to the irradiated surface and (ii) a light emitting surface, which is opposite to the reflection surface and is not covered by a neighboring one of the light guides,
the light emitting surface being defined by (a) a first emitting surface, which is substantially parallel with the reflection surface and (b) a second emitting surface, which is substantially parallel with the irradiated surface,
the first emitting surface and a first portion of the reflection surface defining a first emitting surface region of said each of the light guides, and
each of the light guides being provided with, at least in the first emitting surface region, at least one diffusing element arranged to diffuse the light before the light exits the light guide.

2. The illumination device according to claim 1, wherein:
the first emitting surface and the second emitting surface are joined together to define a curve at a place where they are jointed; and
the curve is a portion of a circle inscribed in an angle between the first emitting surface and the second emitting surface.

3. The illumination device according to claim 1, wherein:
the second emitting surface and a second portion of the reflection surface define a second emitting surface region of said each of the light guides; and
said each of the light guides is further provided with at least one additional diffusing element in the second emitting surface region.

4. The illumination device according to claim 1, wherein:
the at least one diffusing element is provided with different distribution densities according to differences in an amount of light emitted outward over the first emitting surface and the second emitting surface.

5. A surface light source device, comprising:
an illumination device recited in claim 1; and
an optical sheet provided on the light emitting surface of the illumination device.

6. A liquid crystal display device, comprising, as a backlight, a surface light source device recited in claim 5.

* * * * *